United States Patent [19]

Neininger Günter

[11] Patent Number: 5,220,331
[45] Date of Patent: Jun. 15, 1993

[54] CONTINUOUS-WAVE RADAR SET USABLE AS A TRANSMITTER FOR INFORMATION TRANSMISSION

[75] Inventor: Neininger Günter, Ludwigsburg, Fed. Rep. of Germany

[73] Assignee: Alcatel n.v., The Netherlands, Amsterdam, Netherlands

[21] Appl. No.: 903,011

[22] Filed: Jun. 22, 1992

[30] Foreign Application Priority Data

Jun. 21, 1991 [JP] Japan .................................. 4120479

[51] Int. Cl.⁵ .......................... G01S 13/26; G01S 13/38
[52] U.S. Cl. ...................................... 342/70; 342/109; 342/130
[58] Field of Search ................... 342/70, 69, 105, 109, 342/82, 83, 130, 200, 128

[56] References Cited

U.S. PATENT DOCUMENTS

| | | | |
|---|---|---|---|
| 4,005,420 | 1/1977 | McDonald | 342/84 |
| 4,079,377 | 3/1978 | zur Heiden et al. | 342/109 |
| 4,301,453 | 11/1981 | Neininger et al. | 342/109 |
| 5,014,063 | 5/1991 | Studenny | 342/130 |
| 5,072,223 | 12/1991 | Hethuin et al. | 342/122 |
| 5,072,225 | 12/1991 | Eberhardt et al. | 342/200 |
| 5,134,411 | 7/1992 | Adler | 342/130 |

FOREIGN PATENT DOCUMENTS

| | | |
|---|---|---|
| 2146498 | 3/1973 | Fed. Rep. of Germany . |
| 2808544 | 8/1979 | Fed. Rep. of Germany . |
| 2808545C2 | 8/1979 | Fed. Rep. of Germany . |
| 2444383 | 4/1982 | France . |
| 88/04061 | 6/1988 | World Int. Prop. O. . |

Primary Examiner—John B. Sotomayor
Attorney, Agent, or Firm—Frishauf, Holtz, Goodman & Woodward

[57] ABSTRACT

A continuous-wave radar set is additionally usable as a transmitter for transmitting messages, e.g., voice, data, or control information. Besides a first modulator (SM) which produces a sawtooth or triangular frequency modulation of the radar RF signal, there is an additional modulator (ZM) which modulates the radar RF signal with a useful signal during the flyback, i.e., in a phase in which the signal is not used for radar purposes. To achieve exact synchronization between the two modulators, both modulators are controlled by the same clock generator (T).

20 Claims, 2 Drawing Sheets

CONTINUOUS-WAVE RADAR SET USABLE AS A TRANSMITTER FOR INFORMATION TRANSMISSION

BACKGROUND OF THE INVENTION

1. Field of the Invention

The present invention relates to a continuous-wave radar set which can be used on a vehicle, for example, to measure the distance to and relative velocity with respect to a target ahead.

2. Description of the Prior Art

Such a continuous-wave radar set is described, for example, in German Patent 25 14 868 (corresponding to U.S. Pat. No. 4,079,377), and an improved version thereof is described in German Patent 29 00 825 (corresponding to U.S. Pat. No. 4,301,453), the entire contents of which are incorporated herein by reference.

Such continuous-wave radar sets are intended for use in motor vehicles and, as extensive tests have shown, are definitely suited to preventing rear-end collisions (e.g., in conditions of poor visibility). It would be desirable if as many motor vehicles as possible were equipped with such sets as soon as possible. However, wide use of such sets is precluded by the high cost of acquisition due to the complicated and costly technology used therein. An additional inducement to buy such a continuous-wave radar set could be provided if its utility could be increased by an additional use for another purpose, thereby improving the cost/utility ratio.

SUMMARY OF THE INVENTION

It is, therefore, the object of the invention to discover such a use and to supplement a prior art continuous-wave radar set at low cost such that the radar set has this additional use.

This object is attained by the present invention by providing a continuous-wave radar set that is capable of sending out a useful signal in the direction of radiation of the outgoing radar signal. The transmission of the useful signal takes place during the transmission of a trailing edge of a control signal needed by the first modulator for sawtooth frequency modulation, during a time interval in which the signal received in a prior art continuous-wave radar set is mostly blanked. Thus, there is a certain similarity of the present invention to the known utilization of the blanking interval of a video signal for transmitting teletext information in television.

To ensure exact synchronization between the portion of the transmitted signal used for radar functions and the portion used to transmit useful information during the flyback, a common clock generator is advantageously used for both modulators in the present invention.

According to other embodiments of the invention, the useful signal may be modulated by two different methods. The useful signal may contain voice, data, or control instructions. By sending out voice information, provided that suitable simple receivers are present, messages can be transmitted to fixed devices or to preceding vehicles. Data transmission may serve traffic-counting purposes or to implement a so-called electronic license plate, and the transmission of coded and, thus, interference-free control signals can be used, for example, to control garage doors or to influence "intelligent" traffic signal installations.

If the continuous-wave radar set, according to the invention, is additionally equipped with a demodulator, it will be capable of receiving useful signals from other radar sets. This would permit direct communication between the drivers of vehicles approaching each other, without any separate radio sets having to be available for this purpose. If a simple additional receiving antenna were provided at the rear of the vehicle, the drivers of vehicles travelling on behind the other would be able to send messages to the vehicle ahead or receive messages from a following vehicle.

The present invention also is directed generally to the use of a sawtooth or triangular frequency-modulated continuous-wave radar set for information transmission.

BRIEF DESCRIPTION OF THE DRAWINGS

An embodiment of the continuous-wave radar set according to the invention will be described with reference to the accompanying drawings, in which.

DETAILED DESCRIPTION

Figure 1A:
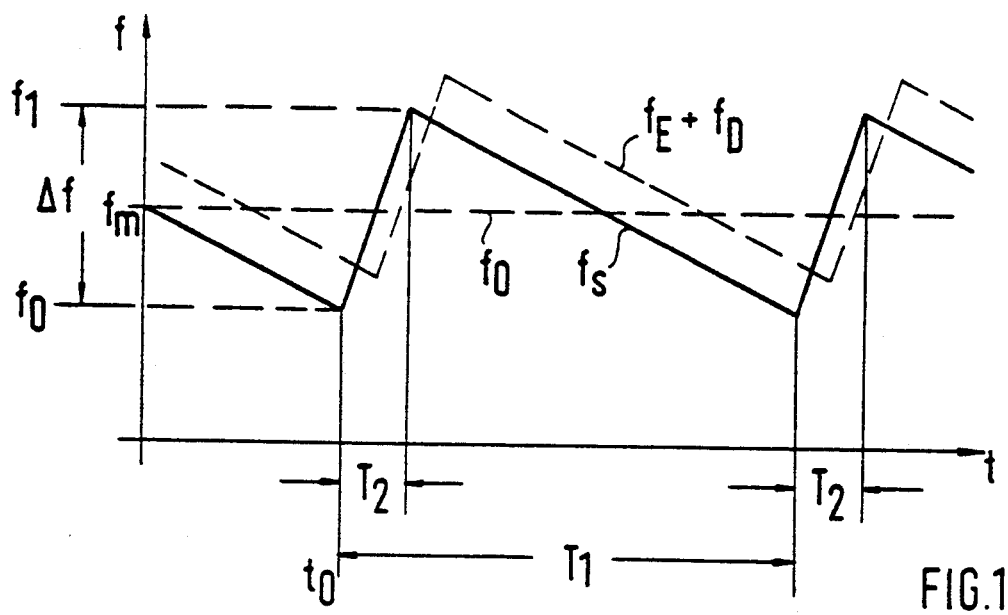
FIG. 1A shows the signals transmitted and received by a prior art sawtooth-modulated continuous-wave radar set.

In FIG. 1A, the signal transmitted by a prior art sawtooth modulated continuous-wave radar set is shown in a time-frequency diagram. Starting from an instant $t_o$, the transmitted frequency $f_s$ increases rapidly from an initial value $f_o$, by a deviation $\Delta f$ of a maximum value $f_1$ and then decreases gradually to the initial value at a constant rate of change. This frequency characteristic recurs with the period $T_1$. The rising portion of the frequency characteristic has a duration $T_2$, which is generally shorter than the period $T_2$, e.g., only 5% of $T_1$. An echo signal from a target located at a fixed distance from the transmitter would have a frequency characteristic $f_E$ which would correspond with the frequency characteristic of the transmitted signal except for a time shift. FIG. 1A shows a frequency characteristic $f_E + f_D$, which corresponds to that of an echo signal from a target moving relative to the radar set. Here, in addition to a time shift, a frequency shift due to the Doppler effect occurs. This Doppler shift is evaluated in the above-mentioned prior art radar set to measure the relative radar-target velocity.

Figure 1B:
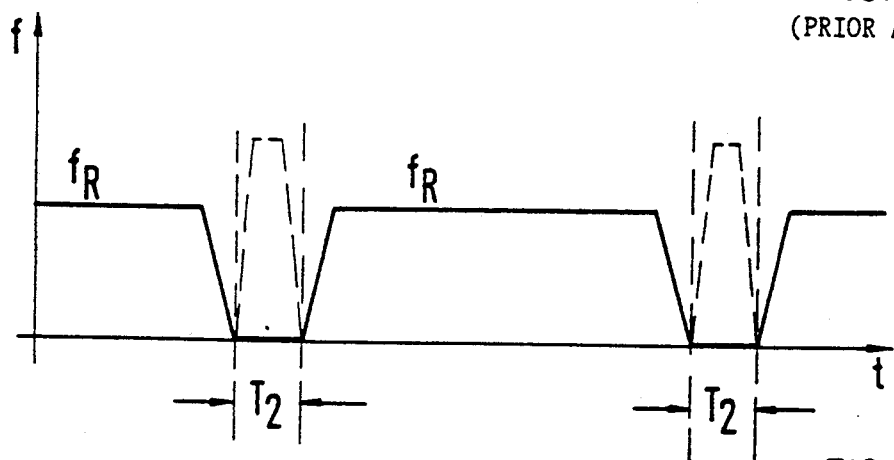
FIG. 1B shows the characteristic of the difference frequency between a transmitted signal and an echo signal.

A useful signal additionally modulated upon the sawtooth in the region of the sharply rising edge in accordance with the invention is not shown in FIGS. 1A and 1B.

FIG. 1B shows the characteristic of the difference frequency $f_R$, which is obtained by subtracting the received frequency from the transmitted frequency. Because of the fast change in the frequency of the transmitted signal during the time $T_2$, difference frequencies occurring during this time are very much higher than the difference frequency in the remaining portion of the period T₁. They are usually not evaluated in order to ensure velocity evaluation with the correct sign.

Figure 1C:
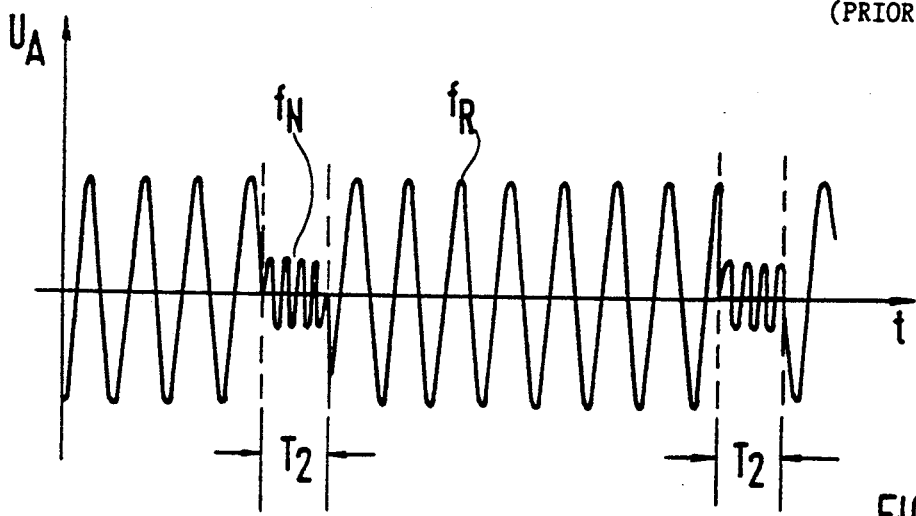
FIG. 1C shows the amplitude of the difference-frequency signal and the useful signal.

FIG. 1C shows the amplitudes $U_A$ of the difference-frequency signal $f_R$ and of a useful signal $f_N$ which occurs during the time $T_2$ and is generated by modulation of the outgoing radar signal during the flyback. The difference-frequency signal $f_R$, which is needed for the velocity measurement, and the useful signal $f_N$, which can be used for information transmission in the time $T_2$, do not interfere with each other.

Figure 2:
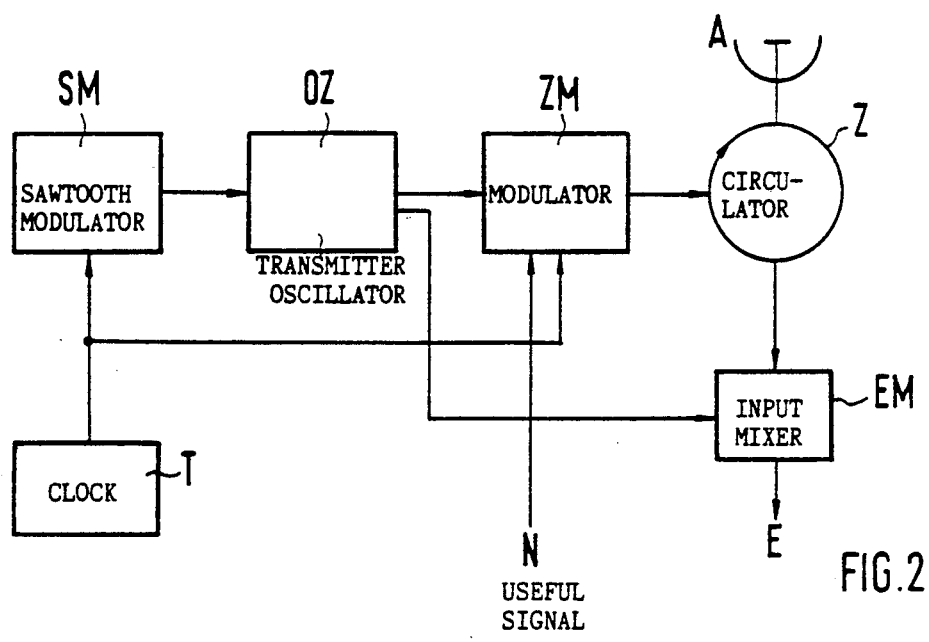
FIG. 2 is a block diagram of those parts of the continuous-wave radar set which are essential to the invention.

FIG. 2 shows a prior art sawtooth-modulated radar set which is modified to output an additional useful signal. A transmitter oscillator OZ controlled by a sawtooth modulator SM feeds through an additional modulator ZM, which is supplied with the useful signal N, into a circulator Z. Connected to the latter are, on the one hand, a radar transmitting and receiving antenna A and, on the other hand, for the receive direction, an input mixer EM which mixes a signal received by the antenna with the frequency of the transmitted signal to produce a signal E which contains the reference signal $f_R$ (FIG. 1B) needed to measure distance and velocity. The signal E also contains the additional useful signal impressed on the outgoing radar signal by the additional modulator ZM, but this useful signal can be easily separated from the reference signal, because it occurs only during the flyback and has a frequency different from that of the reference signal. Exact synchronization of the additional modulator with the sawtooth modulator is achieved by using the same clock generator T for both modulators. The additional modulator may be a PIN-diode attenuator, for example.

Figure 3:
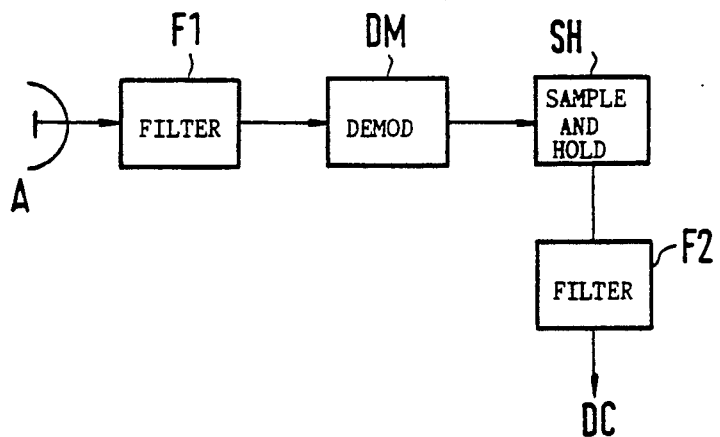
FIG. 3 shows the location of a (additional) useful signal-receiving section in a continuous-wave radar set.

FIG. 3 shows the principle of a receiver for the additional useful signal N. From the antenna A, which may be either a radar transmitting and receiving antenna or a simple receiving antenna without transmit function, the received signal is applied through a first filter $F_1$, to a demodulator DM, where the radar RF is demodulated. The useful signal is further processed according to the type of modulation; for example, it can be fed through a sample-and-hold circuit SH and an additional filter $F_2$ for separating the sawtooth frequency to a decoder DC (not shown), where it can be evaluated.

Figure 4A:
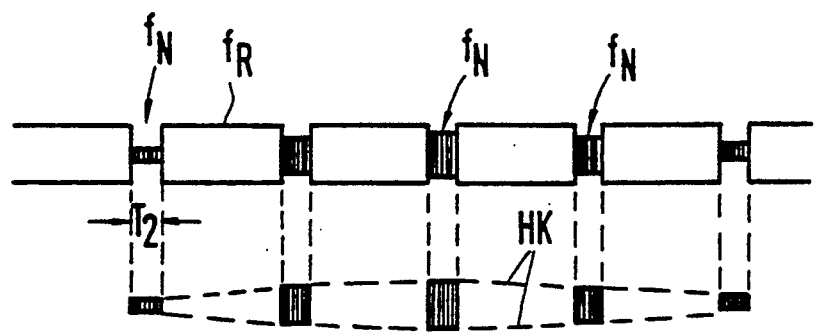
FIGS. 4A and 4B show different types of modulation of the useful signal.
Figure 4B:
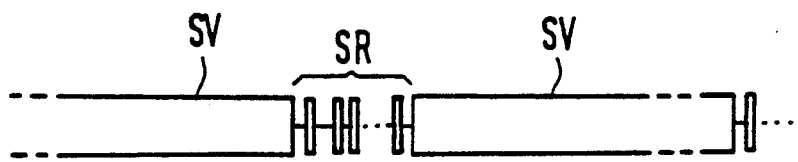

Preferred types of modulation (for the useful signal) are pulse-amplitude modulation (FIG. 4A) and pulse-code modulation (FIG. 4B). With pulse-amplitude modulation, the amplitude of the useful signal $f_N$ changes from flyback to flyback. During a single sawtooth flyback (time $T_2$), which is evaluated as a single pulse, it remains constant. The difference frequency $f_R$ occurs only outside the flyback times. The additional useful information is contained in the envelope HK of the pulse sequence of the flyback as shown in FIG. 4A. The pulse repetition frequency in present-day sawtooth-modulated radar sets transmitting in the 80-GHz range is approximately 50 KHz.

If pulse-code modulation is employed, it is advantageous, provided the flyback phases are wide enough, to modulate these flyback phases with subpulses, so that one pulse code word per flyback will be transmitted, for example.

Besides the types of modulation mentioned above, any other type of modulation can be used. If the useful signal is to serve to transmit data or control information, for example, frequency modulation, which permits simple data transmission by frequency-shift keying, may be advantageous.

While the invention has been described with reference to the drawings and structures disclosed herein, it is not confined to the details set forth, and is intended to cover modifications or changes as may come within the scope of the following claims.

I claim:

1. A continuous-wave radar set comprising:
   a transmitting portion; and
   a receiver portion;
   said transmitting portion comprising:
     a first modulator for producing one of a sawtooth and a triangular frequency modulation on an outgoing radar signal that is transmitted by said transmitting portion toward a target;
   said receiver portion comprising:
     means for receiving an echo signal of the transmitted outgoing radar signal from said target; and
     evaluating means for evaluating said echo signal in one of a region of a gradually falling edge portion of a sawtooth waveform of a sawtooth frequency modulated signal, and a region of an edge portion of a triangular waveform of a triangular frequency modulated signal;
   said transmitting portion further comprising a second modulator for modulating said outgoing radar signal with a useful signal during one of:
     a sharply rising edge portion of said sawtooth waveform; and
     another edge portion of said triangular waveform which is different from that edge portion of said triangular waveform that is being evaluated by said evaluating means.

2. A continuous-wave radar set as claimed in claim 1, further comprising:
   clock means connected to both the first and second modulators for controlling both said modulators.

3. A continuous-wave radar set as claimed in claim 1, wherein the second modulator modulates said outgoing radar signal with said useful signal for generating one of a pulse-amplitude modulation and a pulse code modulation in said outgoing radar signal.

4. A continuous-wave radar set as claimed in claim 2, wherein the second modulator modulates said outgoing radar signal with said useful signal for generating one of a pulse-amplitude modulation and a pulse code modulation in said outgoing radar signal.

5. A continuous-wave radar set as claimed in claim 1, wherein said receiver portion further comprises:
   a demodulator for demodulating said echo signal and for extracting said useful signal from said echo signal during a flyback period.

6. A continuous-wave radar set as claimed in claim 2, wherein said receiver portion further comprises:
   a demodulator for demodulating said echo signal and for extracting the useful signal from the echo signal during a flyback period.

7. A continuous-wave radar set as claimed in claim 1, wherein said second modulator modulates said outgoing radar signal with said useful signal for generating a frequency modulation in said outgoing radar signal.

8. A continuous-wave radar set as claimed in claim 7, wherein the frequency modulation generated by the second modulator comprises a frequency shift keying modulation of the outgoing radar signal.

9. A continuous-wave radar set as claimed in claim 2, wherein said second modulator modulates said outgoing radar signal with said useful signal for generating a frequency modulation in said outgoing radar signal.

10. A continuous-wave radar set as claimed in claim 9, wherein the frequency modulation generated by the second modulator comprises a frequency shift keying modulation of the outgoing radar signal.

11. A continuous-wave radar set as claimed in claim 1, wherein said receiver portion further comprises:
removing means for removing the useful signal from the received echo signal, said removing means including demodulating means for demodulating the received echo signal.

12. A continuous-wave radar set as claimed in claim 1, wherein the second modulator means modulates the outgoing radar signal with the useful signal during a flyback period of the one of said sawtooth and the triangular frequency modulation produced by the first modulator.

13. A continuous-wave radar set as claimed in claim 1, wherein said receiver portion includes means for receiving outgoing radar signals, including said useful signals, transmitted from another radar set.

14. A continuous-wave radar set as claimed in claim 2, wherein said receiver portion includes means for receiving outgoing radar signals, including said useful signals, transmitted from another radar set.

15. A continuous-wave radar system for transmitting a useful information signal along with an outgoing radar signal to receivers positioned to receive said outgoing radar signal and said useful signal, said continuous-wave radar system including a radar set, and at least one receiver spaced apart from said radar
  said radar set including:
    a transmitting portion; and
    a receiver portion;
  said transmitting portion comprising:
    a first modulator for producing one of a sawtooth and a triangular frequency modulation on an outgoing radar signal that is transmitted by said transmitting portion toward a target;
  said receiver portion comprising:
    means for receiving an echo signal of the transmitted outgoing radar signal from said target; and
    evaluating means for evaluating said echo signal in one of a region of a gradually falling edge portion of a sawtooth waveform of a sawtooth frequency modulated signal, and a region of an edge portion of a triangular waveform of a triangular frequency modulated signal;
  said transmitting portion further comprising a second modulator for modulating said outgoing radar signal with a useful signal during one of:
    a sharply rising edge portion of said sawtooth waveform; and
    another edge portion of said triangular waveform which is different from that edge portion of said triangular waveform that is being evaluated by said evaluating means; and
  said at least one receiver including:
    a receiver portion for receiving the transmitted outgoing radar signal, including said useful signal, from said radar set; and
    means for extracting the useful signal from the thus received outgoing radar signal.

16. A continuous-wave radar system as claimed in claim 15, wherein the first modulator modulates an output of an oscillator with a sawtooth signal to provide said sawtooth modulation.

17. A continuous-wave radar system as claimed in claim 16, wherein said transmitting portion further comprises:
clock means connected to both the first and second modulators for controlling both of said modulators.

18. A continuous-wave radar system as claimed in claim 15, wherein the second modulator modulates said outgoing radar signal with said useful signal for generating one of a pulse-amplitude modulation and a pulse code modulation on said outgoing radar signal.

19. A continuous-wave radar system as claimed in claim 15, wherein said second modulator modulates said outgoing radar signal with said useful signal, for generating a frequency modulation on said outgoing radar signal.

20. A continuous-wave radar system as claimed in claim 15, wherein said receiver portion in said radar set further comprises:
a demodulator for demodulating said echo signal and for extracting the useful signal from said echo signal during a flyback period.

* * * * *